(12) United States Patent
Lemay et al.

(10) Patent No.: US 11,586,682 B2
(45) Date of Patent: Feb. 21, 2023

(54) METHOD AND SYSTEM FOR ENHANCING A VMS BY INTELLIGENTLY EMPLOYING ACCESS CONTROL INFORMATION THEREIN

(71) Applicant: Avigilon Corporation, Vancouver (CA)

(72) Inventors: Christian Lemay, Surrey (CA); Steven Lewis, Point Roberts, WA (US); Elaine A. Ling Quek, New Westminster (CA); Iain McVey, Coquitlam (CA); William Christopher Weston, Port Moody (CA)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 574 days.

(21) Appl. No.: 16/526,853

(22) Filed: Jul. 30, 2019

(65) Prior Publication Data
US 2021/0034671 A1  Feb. 4, 2021

(51) Int. Cl.
*G06F 17/00* (2019.01)
*G06F 16/907* (2019.01)
*H04N 5/232* (2006.01)
*H04N 7/18* (2006.01)
*G06F 16/903* (2019.01)

(52) U.S. Cl.
CPC ...... *G06F 16/907* (2019.01); *G06F 16/90344* (2019.01); *H04N 5/23206* (2013.01); *H04N 7/186* (2013.01)

(58) Field of Classification Search
CPC ............ G06F 16/907; G06F 16/90344; H04N 5/23206; H04N 5/23219; H04N 5/23229; H04N 5/23218; H04N 7/186
See application file for complete search history.

(56) References Cited

U.S. PATENT DOCUMENTS

| | | | |
|---|---|---|---|
| 7,440,594 B2* | 10/2008 | Takenaka | G06K 9/00221 382/118 |
| 9,305,196 B2 | 4/2016 | Schoner et al. | |
| 10,121,515 B2 | 11/2018 | Doumbouya et al. | |
| 11,095,803 B2* | 8/2021 | Kim | H04N 5/23229 |
| 2005/0168574 A1* | 8/2005 | Lipton | H04N 7/188 348/143 |
| 2007/0127774 A1* | 6/2007 | Zhang | G06K 9/00771 382/103 |

(Continued)

OTHER PUBLICATIONS

K. Babutain, S. Alaklobi, A. Alghamdi and S. Sasi, "Automated Surveillance of Computer Monitors in Labs," 2015 International Conference on Advances in Computing, Communications and Informatics (ICACCI), pp. 1026-1030, Aug. 2015.*

(Continued)

*Primary Examiner* — Greta L Robinson

(57) ABSTRACT

Methods, systems, and techniques for enhancing a VMS are disclosed. One of the disclosed methods includes populating a user interface page with one or more images, each showing a single person matched to a known identity, and each taken contemporaneously with one or more respective access control event occurrences identifiable to the single person. User selection input is receivable to mark at least one of the images as a reference image for an appearance search to find additional images of the single person captured by video cameras within a surveillance system.

18 Claims, 8 Drawing Sheets

(56) References Cited

U.S. PATENT DOCUMENTS

| | | | | |
|---|---|---|---|---|
| 2012/0169880 A1* | 7/2012 | Williamson | ............. | G07C 9/22 |
| | | | | 348/143 |
| 2012/0300081 A1* | 11/2012 | Kim | ................ | G08B 13/19671 |
| | | | | 348/159 |
| 2013/0216107 A1* | 8/2013 | Huang | ............... | G06K 9/00744 |
| | | | | 382/118 |
| 2017/0270722 A1 | 9/2017 | Tse et al. | | |
| 2018/0157939 A1 | 6/2018 | Butt et al. | | |

OTHER PUBLICATIONS

A. Nag, J. N. Nikhilendra and M. Kalmath, "IOT Based Door Access Control Using Face Recognition," 2018 3rd International Conference for Convergence in Technology (I2CT), pp. 1-3, Apr. 2018.*

A. R. Al-Sudani et al., "Hiding RFID in the Image Matching Based Access Control to a Smart Building," IEEE Smartworld, Ubiquitous Intelligence & Computing, Advanced & Trusted Computing, Scalable Computing & Communications, Cloud & Big Data Computing, Internet of People and Smart City, 1988-1993, Oct. 2018.*

"Security Desk User Guide 5.5", EN.500.004-V5.5B(4), Jul. 28, 2016, 539 pages.

"Introducing the Avigilon Identity Search Feature", https://www.youtube.com/watch?v=34EAFCCRc48, Sep. 21, 2018.

"Avigilon Appearance Search Technology Integrates with Access Control Manager System", http://news.avigilon.com/News-Releases/News-Release-Details/2018/Avigilon-Appearance-Search-Technology-Integrates-with-Access-Control-Manager-System/default.aspx, Sep. 18, 2018.

* cited by examiner

METHOD AND SYSTEM FOR ENHANCING A VMS BY INTELLIGENTLY EMPLOYING ACCESS CONTROL INFORMATION THEREIN

TECHNICAL FIELD

The present disclosure relates to methods, systems, and techniques for employing access control information within a Video Management System (VMS).

BACKGROUND

Surveillance systems typically employ video cameras or other image capturing devices or sensors to collect image data such as videos. In the simplest systems, images represented by the image data are displayed for contemporaneous screening by security personnel and/or recorded for later review after a security breach. In those systems, the task of detecting and classifying visual objects of interest is performed by a human observer. A significant advance occurs when the system itself is able to perform object detection and classification, either partly or completely.

In a typical surveillance system, one may be interested in, for example, detecting objects such as humans, vehicles, and animals that move through the environment. More generally, it is beneficial for a surveillance system to be able to, without relying on assistance from a human operator, identify and classify, in a computationally efficiently manner, different objects that are recorded by the cameras that form part of the system.

In addition to a surveillance system including one or more video cameras, a surveillance system can also include access control apparatus. In this regard, ensuring that only authorized individuals access protected or secured areas may be crucially important (for example, at an airport, a military installation, office building, etc.). Protected or secured areas may be defined by physical doors (e.g., doors through which a human may enter) and walls, or may be virtually defined in other ways. For instance, a protected area may be defined as one in which unauthorized entry causes a detector to signal intrusion and optionally send a signal or sound an alarm either immediately or if authorization is not provided within a certain period of time.

Access control apparatus may limit entry into protected or secured areas of buildings, rooms within buildings, real property, fenced-in regions, or assets and resources therein, to only those individuals who have permission to enter. Thus, an access control system should identify the individual attempting to enter the secured area, and verify the individual is currently authorized to enter.

SUMMARY

According to a first aspect, there is provided a method that includes receiving user input of a name via a first user interface page generated by a computing device, matching the name to a single person registered in an access control database, and populating a second user interface page with one or more images, each showing the single person, and each taken contemporaneously with one or more respective access control event occurrences identifiable to the single person. The method also includes receiving user selection input that marks at least one of the images as a reference image for an appearance search to find additional images of the single person captured by video cameras within a surveillance system. The method also includes running the appearance search.

According to another aspect, there is provided a tangible, non-transitory, computer-readable storage medium having instructions encoded therein, wherein the instructions, when executed by at least one processor, cause a carrying out of a method that includes generating a first user interface page, receiving user input of a name via the first user interface page, and matching the name to a single person registered in an access control database. A second user interface page is populated with one or more images, each showing the single person, and each taken contemporaneously with one or more respective access control event occurrences identifiable to the single person. User selection input can be received to mark at least one of the images as a reference image for an appearance search to find additional images of the single person captured by video cameras within a surveillance system. Following the marking of the at least one of the images as the reference image, the appearance search is run.

This summary does not necessarily describe the entire scope of all aspects. Other aspects, features and advantages will be apparent to those of ordinary skill in the art upon review of the following description of example embodiments.

BRIEF DESCRIPTION OF THE DRAWINGS

In the accompanying drawings, which illustrate one or more example embodiments.

Similar or the same reference numerals may have been used in different figures to denote similar example features illustrated in the drawings.

DETAILED DESCRIPTION

Figure 1:
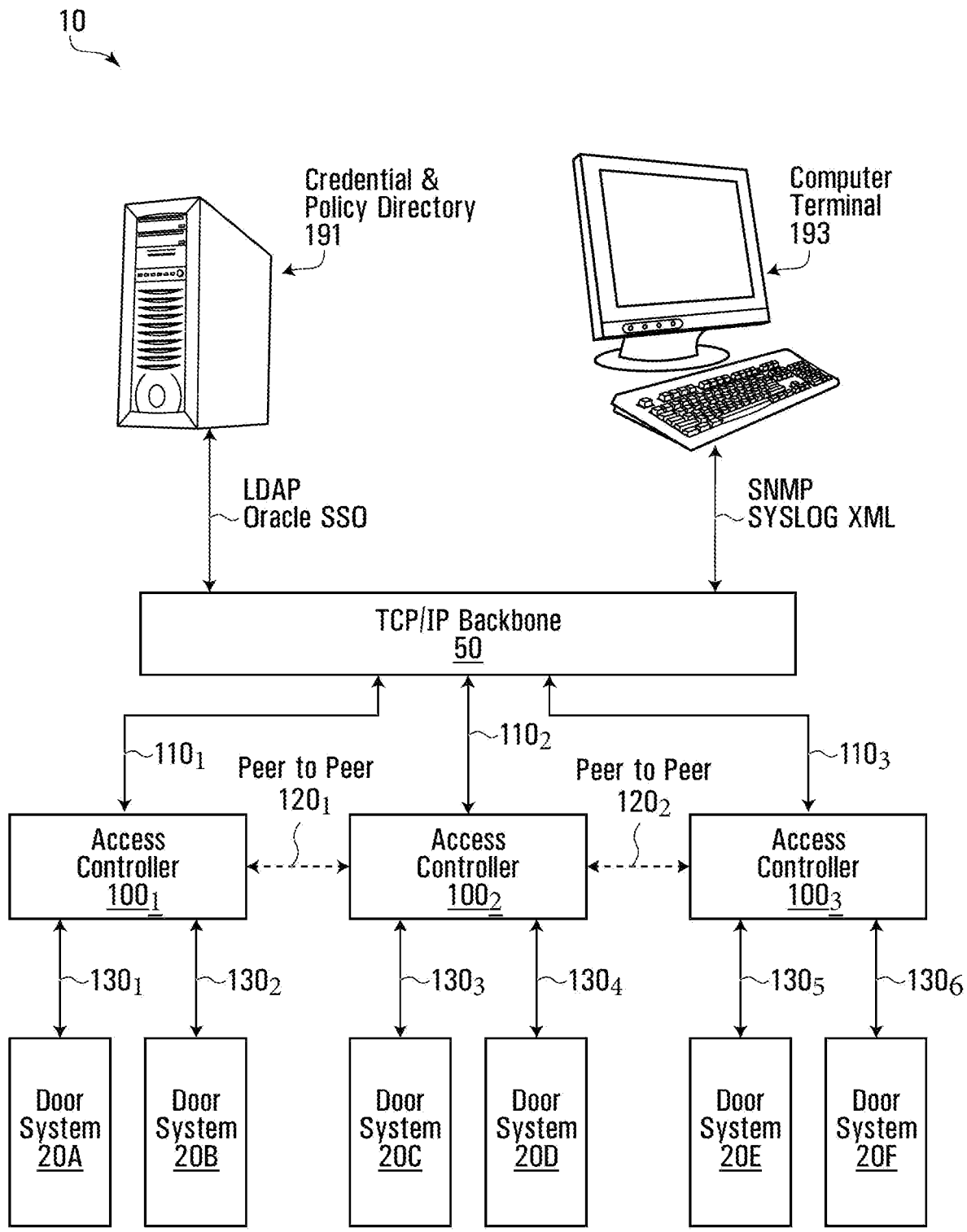
FIG. 1 illustrates a block diagram of an access control system according to an example embodiment.

Numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

The following acronyms are used within the present disclosure:

ASCII—American Standard Code for Information Interchange
ATM—Asynchronous Transfer Mode
CNN—Convolutional Neural Network
CPU—Central Processing Unit
CSV—Comma-Separated Value
CYKM—Cyan-Yellow-Black-Magenta
DSL—Digital Subscriber Line
FOV—Field Of View
GPU—Graphics Processing Unit
GSM—Global System for Mobile Communications
HTTPS—Hypertext Transfer Protocol Secure
HOG—Histogram of Oriented Gradients
ID—Identification
ISDN—Integrated Services Digital Network
LAN—Local Area Network
PDA—Personal Digital Assistant
PIN—Personal Identification Number
RAM—Random Access Memory
RF—Radio Frequency
RFID—Radio Frequency Identification
RGB—Red-Green-Blue
RPC—Remote Procedure Call
SIFT—Scale-Invariant Feature Transform
SLIP/PPP—Serial Line Internet Protocol/Point-to-Point Protocol
SNMP—Simple Network Management Protocol
SoC—System-on-Chip
SURF—Speeded Up Robust Features
TCP/IP—Transmission Control Protocol/Internet Protocol
UI—User Interface
VPU—Vision Processing Unit
WAN—Wide Area Network
XML—Extensible Markup Language
YCBCR—Green (Y), Blue (Cb), Red (Cr)
YUV—Luminance-Bandwidth-Chrominance The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context. The term "and/or" herein when used in association with a list of items means any one or more of the items comprising that list.

The word "approximately" when used in conjunction with a number means, depending on the embodiment, that number itself, within 1% of that number, within 2% of that number, within 3% of that number, within 4% of that number, within 5% of that number, within 6% of that number, within 7% of that number, within 8% of that number, within 9% of that number, or within 10% of that number.

A plurality of sequential image frames may together form a video captured by the video capture device. Each image frame may be represented by a matrix of pixels, each pixel having a pixel image value. For example, the pixel image value may be a single numerical value for grayscale (such as, for example, 0 to 255) or a plurality of numerical values for colored images. Examples of color spaces used to represent pixel image values in image data include RGB, YUV, CYKM, YCBCR 4:2:2, YCBCR 4:2:0 images.

"Metadata" or variants thereof herein refers to information obtained by computer-implemented analyses of images including images in video. For example, processing video may include, but is not limited to, image processing operations, analyzing, managing, compressing, encoding, storing, transmitting, and/or playing back the video data. Analyzing the video may include segmenting areas of image frames and detecting visual objects, and tracking and/or classifying visual objects located within the captured scene represented by the image data. The processing of the image data may also cause additional information regarding the image data or visual objects captured within the images to be output. That additional information is commonly referred to as "metadata". The metadata may also be used for further processing of the image data, such as drawing bounding boxes around detected objects in the image frames.

As will be appreciated by one skilled in the art, the various example embodiments described herein may be embodied as a method, system, or computer program product. Accordingly, the various example embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, the various example embodiments may take the form of a computer program product on a computer-usable storage medium having computer-usable program code embodied in the medium Any suitable computer-usable or computer readable medium may be utilized. The computer-usable or computer-readable medium may be, for example but not limited to, an electronic, magnetic, optical, electromagnetic, infrared, or semiconductor system, apparatus, device, or propagation medium. In the context of this document, a computer-usable or computer-readable medium may be any medium that can contain, store, communicate, propagate, or transport the program for use by or in connection with the instruction execution system, apparatus, or device.

Computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or entirely on the remote computer or server. In the latter scenario, the remote computer may be connected to the computer through a local area network (LAN) or a wide area network (WAN), or the connection may be made to an external computer (for example, through the Internet using an Internet Service Provider).

Various example embodiments are described below with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Access control systems, devices, and methods herein described may encompass any suitable access technology, such as the following:

1. using PINs and passwords that can be entered at a key pad associated with the access point (for example, a door);
2. using biometrics that can be entered by individuals via special readers associated with the access point;
3. using traditional signatures, provided by the individuals via a special pad associated with the access point;
4. using smart cards or contactless cards (for example, sending a PIN to the access point via a special reader/receiver);
5. using a digital certificate (for example, one stored in a smart card, contactless card, etc.) that can "communicate to the access point" via a card reader or other receiver;
6. using mobile access where the token is on a mobile device; and
7. using a physical key inserted into a lock for the access point; such a key/lock mechanism may include a special encoding on the key that is read in the lock.

The above list of access technologies is not meant to be exhaustive. Furthermore, some facilities may use combinations of these technologies. The technologies may be used in any environment, including in government facilities, private businesses, public facilities, and other types of premises.

As a further explanation of some of the above access technologies, some current access control systems use doors equipped with an entry device such as a key pad, through which an individual enters a PIN or password. The key pad has an attached memory or elementary processor in which a list of valid PINs/passwords is stored, so that the PIN/password may be checked to determine whether it still is valid. If the PIN/password is valid, the door opens; otherwise the door remains locked. Also, data on a card is another option, where the card is presented and the validation is completed between the card and reader.

Some current card-based access control systems use radio frequency identification (RFID) technology. The access card reader includes an RFID transceiver, and the access card includes an RFID tag or transponder. The RFID transceiver transmits a radio frequency (RF) query to the card as the card passes over the RFID transceiver. The RF transponder includes a silicon chip and an antenna that enables the card to receive and respond to the RF query. The response is typically an RF signal that includes a pre-programmed identification (ID) number. The card reader receives the signal and transmits the ID number to a control panel using a wired or wireless connection. Some card readers may perform some basic formatting of the identification data prior to sending the data to the control panel, but may be unable to perform higher level functions. Also, the data transfer may, in some examples, use encryption and special keys in the reader to unlock the sector data in the token.

The access controllers, control systems, and control methods are described below with reference to the following terms (amongst others):

1. Access controller: a device programmed to make access decisions based on a cached database supplied by an identity store. Access requests are made via a sensing device (card reader, push button, etc.); authorization is checked either locally or by referring to a remote identity store for processing. If an access request is approved, output and input devices/systems (for example, entry doors) are manipulated to allow access.

2. Door controller: a device in communication with the access controller and one or both of wired and wirelessly communicative with a credential reader and associated input and output hardware. The door controller sends changes of state and credential reads to the access controller, waits for an authorization response from the access controller, and commands attached input, output, and credential readers according to the authorization response. In some examples, door controllers have the capability to operate in a so-called "degraded" mode, where the door controllers can make access decisions in the case where the controller is off line.

3. Browser: a software program used to access and display Internet Web pages; example browsers include Microsoft Edge™, Google Chrome™, Mozilla Firefox™, and Apple Safari™.

4. Identity store (or directory): a database including relational, hierarchical, networked or other architectures that includes authorization and authentication data for individuals, credentials, resources, and group memberships. The identity store may reside at a facility owned and operated by an entity different from the entity owning and/or operating the protected area.

In an embodiment, the access controller comprises a computer comprising a processor and a non-transitory computer readable medium communicative with the processor, with the non-transitory medium having stored thereon computer program code that, when executed by the processor, causes the access controller to perform one or more of the methods described herein, or suitable combinations thereof. The computer may run, for example, the Linux™ operating system. In one embodiment, the computer provides the necessary processor, storage, and connectivity for the computer program code and all required computer program code is loaded onto the computer without requiring any installation onto any other computer system. In another embodiment, the computer may comprise one or more processors networked with one or more computer readable media, and the computer program code and/or execution thereof may be performed in a distributed manner across more than one of the processors.

In some examples, the access controller may be a self-provisioning access device, and may obtain and maintain a cached list of credentials and associated access privileges; these data may allow the access controller to make on-the-spot, real-time access decisions without communication to any other access control system(s). The cache of credentials and associated access privileges may be acquired from one or more host systems periodically, including on a schedule, in real time, or as a complete snapshot. For example, the access controller may, in effect, continuously access a host system directory of access credentials and associated access privileges, and download some or all of the credentials and privileges. In at least one example embodiment, the access controller downloads these data for a select number of individuals. An individual for whom the data are downloaded may be uniquely identified, identified by group association, or identified by assigned roles(s).

The access controller may be used in either real-time (on demand) or on a schedule, to send real time events to a logging and monitoring device or system. In one example embodiment, an event may be an access door unlocking or locking, an access door open or closed signal (for example, from a limit switch or position sensor, or based on a logic routine), an access door fault or unusual operation (open for a time exceeding a variable threshold), etc. The events may be sent in any number of suitable formats, including XML, directly into a relational database or system logging facility of any number of remote devices or systems. If connectivity is lost, the access controller may buffer the events and may continue event transmission when connectivity is re-established.

In some examples, the access controller may comprise or provide a browser-accessible User Interface (UI). Such an interface provides an access control system operator the ability to configure any number of access points (for example, doors) and their operation, and associated mapping to individuals and/or groups (on an individual basis, group basis, and/or defined role basis) to convey access privileges. With the same interface, the operator may configure the access controller to communicate with credential sources, including credential sources implemented in or using a relational database, a directory or hierarchical data store, flat files such as comma-separated value (CSV) file, any common ASCII file, a unicode file, or any suitable text file.

With the interface as described above, the operator selects and configures a type of data synchronization including timed intervals, scheduled, on-demand, and real-time. The synchronization methods may include subscription, in which a host access credentials and policy system "pushes" information changes to the access controller; audit trail, in which the access controller requests information updates; or data modification triggers, in which code written into the host system detects information changes and sends the changed information to the access controller. The subscription method may require a persistent, always-on connection between the host system and the access controller while the other example two methods may use a transient connection.

The access controller initiates connection(s) to the sources and retrieves the credential and policy information to build the controllers local cache. Each individual may have a unique identifier to collate the individual's information from multiple sources into a single record. Once transferred to the local cache, the information may be used in access decisions as credentials are presented at access control points.

The access controller may be used to assign priorities to events. The event priorities may determine, for example, which events, and in what order, those events are sent to a computer terminal where a user reviews them on a display screen. Alternatively or additionally, the event priorities may determine how the computer terminal displays those different events. For example, the events having a relatively high priority may be displayed in an attention attracting manner, such as by using bright colors or large or flashing text, compared to events having relatively low priority.

Figure 2:
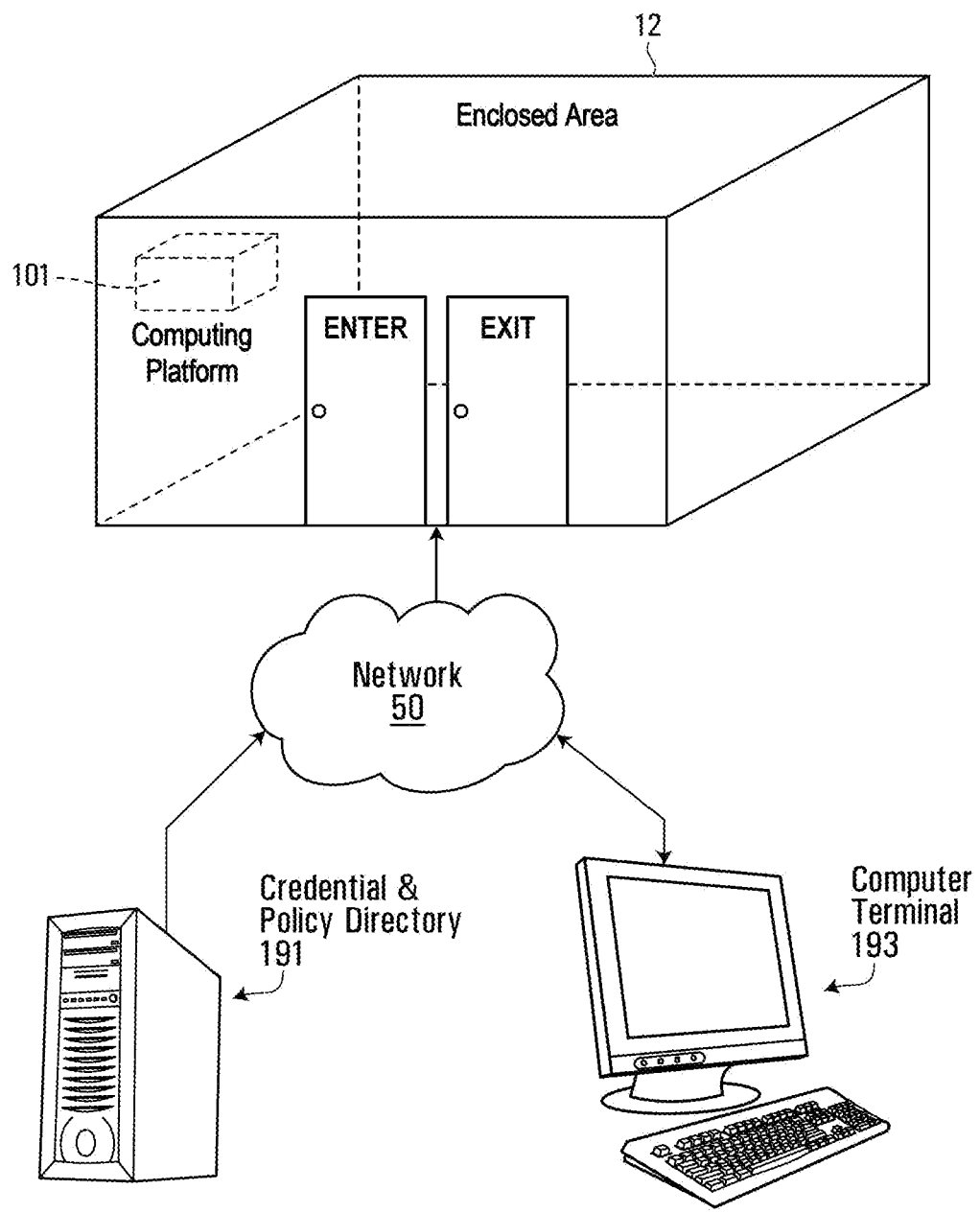
FIG. 2 illustrates another block diagram providing additional detail in relation to the access control system of FIG. 1.
Figure 3:
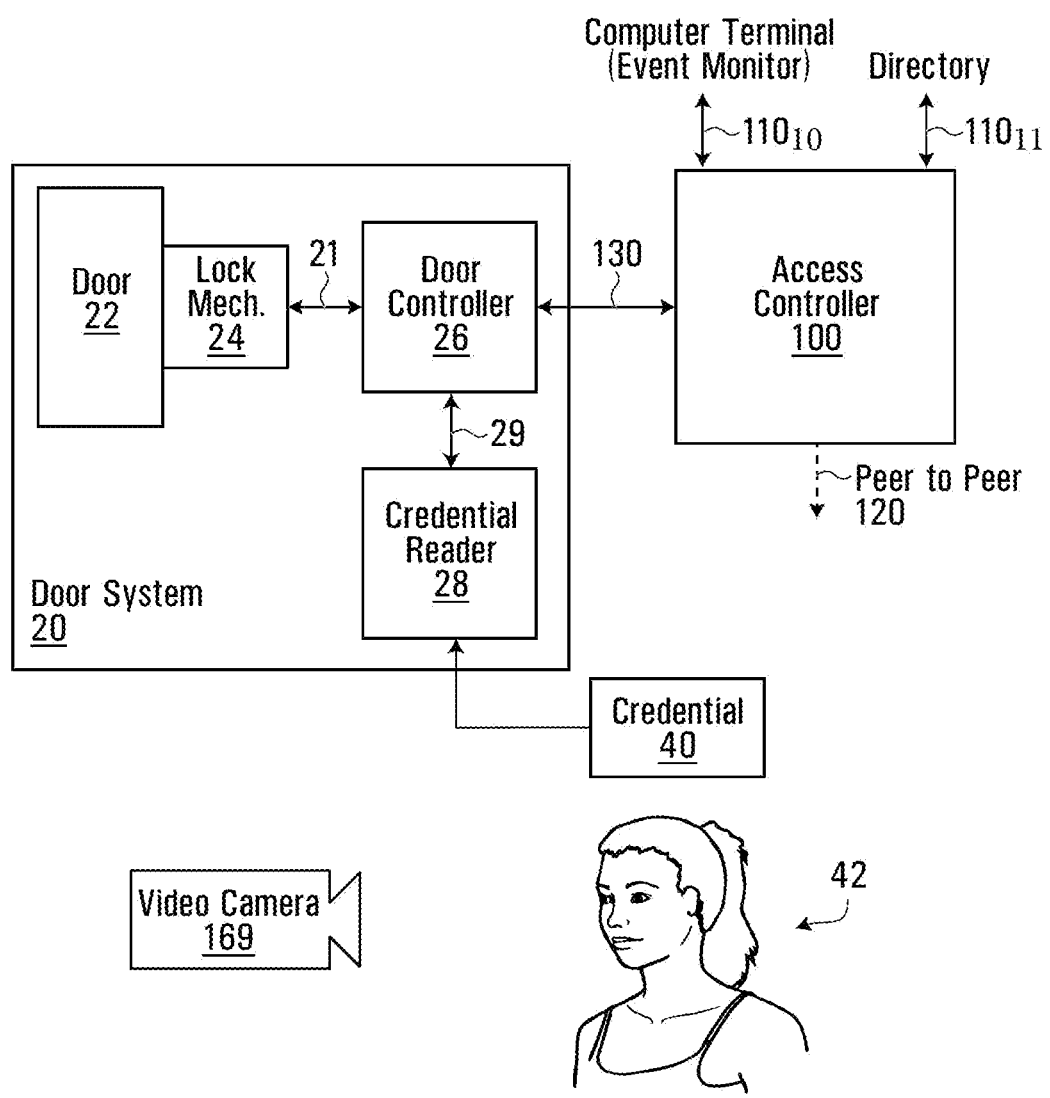
FIG. 3 illustrates yet another block diagram providing additional detail in relation to the access control system of FIG. 1.

FIGS. 1-3 illustrate, in accordance with an example embodiment, an access control system 10 and select components thereof. In FIG. 1, the access control system 10 includes door systems 20, access controllers 100, a credential and policy directory 191 and computer terminal 193, all of which are intended to limit or control access to a plurality of areas or volumes. The controllers 100 communicate 110 with the directory 191 and the computer terminal 193 using, for example, a TCP/IP backbone 50. The TCP/IP backbone 50 may be wired or wireless, or a combination of wired and wireless. The backbone 50 may include elements of a local area network (LAN) and a wide area network (WAN), including the Internet. Communications 110 between the access controller 100 and the directory 191 may be secure communications (for example, HTTPS communications).

FIG. 2 illustrates selected components of the access control system 10 to limit or control access by individuals to an example enclosed area 12. As shown, the enclosed area 12 is a six-sided structure with two doors. The doors are a part of respective door systems 20 as described with reference to FIGS. 1 and 3. The door systems 20 are intended for normal human access. Other access points (for example, windows) may exist, and their operation may be monitored, alarmed, and controlled, but such access points are not described further herein.

The enclosed area 12 includes a computing platform 101 on which are implemented access control features that control, monitor, and report on operation of the door systems 20. The computing platform 101 may be fixed or mobile. The computing platform 101 is shown inside the enclosed area 12 but need not be. In executing its control, monitoring, and reporting functions, the computing platform 101 with its access control features may communicate external to the enclosed area 12 by way of a network 50 with the (remote) directory 191 and with (remote) computer terminal 193. The network 50 may be wired and/or wireless, and may provide for secure communications and signaling in addition to non-secure communications and signaling.

The enclosed area 12 may be a room in a building, the building itself, or any other suitable structure. The enclosed area 12 is not limited to a six-sided configuration. The enclosed area 12 could be an at least partially open structure (for example, a sports stadium), a fenced-in area (for example, an area surrounding a runway), or an area having an "invisible" fence or "virtual walls." The enclosed area 12 may be geographically fixed (for example, a building, a room in a building) or mobile (for example, a trailer, airplane, ship, or container).

The enclosed area 12 may be used to control access to premises, classified documents and/or devices contained therein, access to individuals, access to valuable items such as rare paintings, jewelry, etc., access to dangerous conditions, etc. The enclosed area 12 may, for example, be a safe or vault at a bank, a control room for a nuclear reactor, a hangar for a classified, new-technology airplane, or a passenger gate at an airport.

Figure 4:
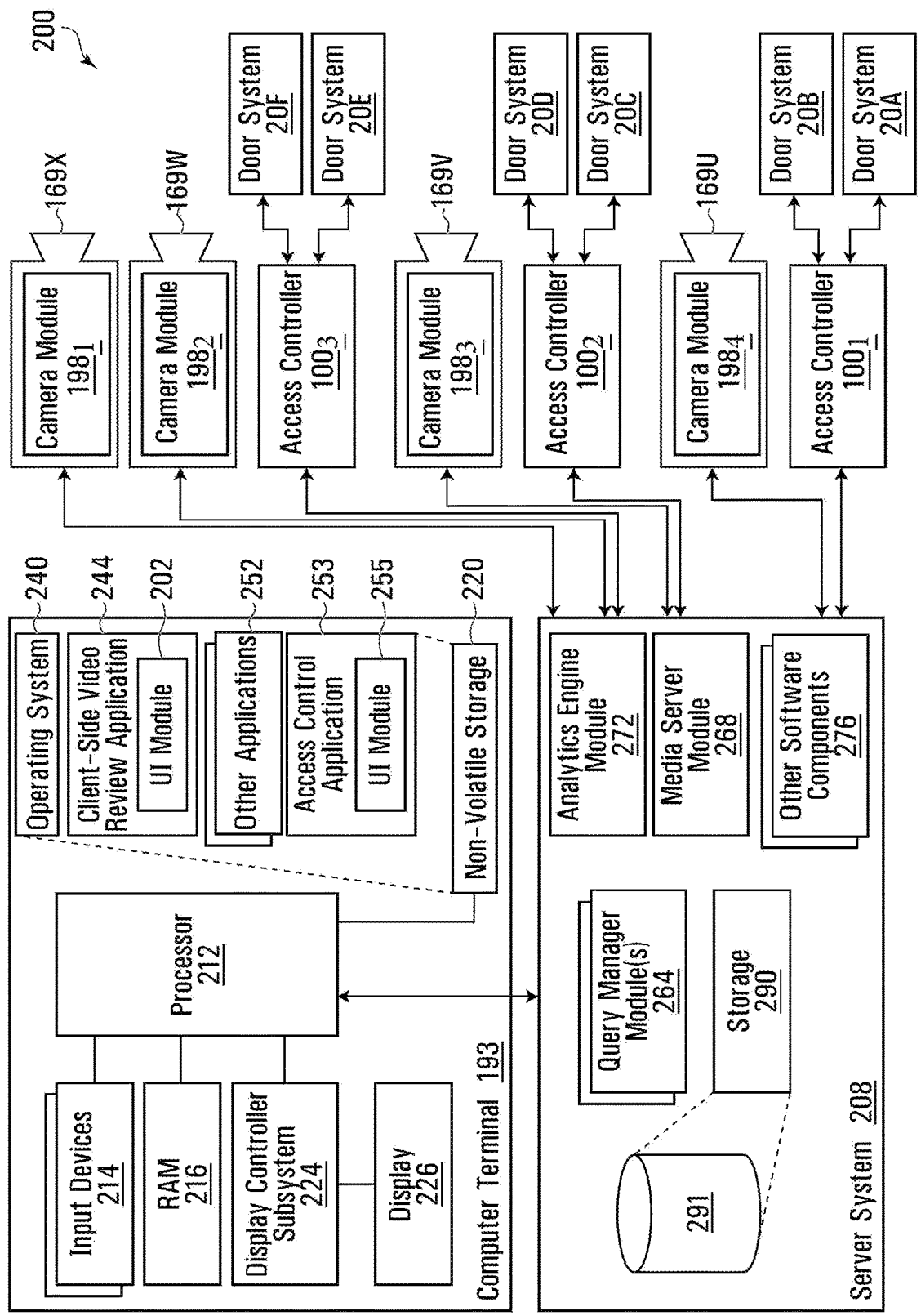
FIG. 4 illustrates a block diagram of an example surveillance system, including both access controlled doors and video cameras, within which methods in accordance with example embodiments can be carried out.

In a mobile configuration, the enclosed area 12 may be used, for example, in field operations to quickly establish a secure facility anywhere in the world. Moreover, the enclosed area 12 in the mobile configuration may be used for very different operations, with different individuals able to access the mobile enclosed area 12, depending on its intended use, by configurations changes implemented through an interface provided by the UI module 255 (FIG. 4). Thus, the access control system 10 may provide not only access control, event monitoring, and reporting, but also the flexibility to quickly adapt the enclosed area 12, in the mobile configuration, to any operation or mission, anywhere in the world, for which access control is desired.

Returning to FIG. 1, the access controllers 100 also may optionally communicate between and among themselves using peer-to-peer communications 120. Such optional peer-to-peer communications 120 may be enabled by use of a secure LAN, for example. Alternately, the optional peer-to-peer communications 120 may be wireless secure communications. The optional peer-to-peer communications 120 also may follow the TCP/IP protocol.

The optional peer-to-peer communications 120 allow an access controller 100 to send and receive access status information and events to and from the other access controllers 100. Thus, if a door system 20 is inoperative, its associated access controller 100 may provide this information to the other access controllers 100. The optional peer-to-peer communications 120 allow one access controller 100 to act as a parent (master) access controller and the remaining access controllers 100 to act as child (subservient) access controllers. In this aspect, information and configurations may be stored or implemented on the parent access controller and then may be replicated on the child access controllers.

The access controller 100 may communicate with the door systems 20 using wired and/or wireless secure communications 130.

The door systems 20, which are described in more detail with reference to FIG. 2, control normal human access to an enclosed area. In the example of FIG. 1, six door systems 20 are illustrated. In an embodiment, the six door systems 20 provide three enclosed area access points, and the door systems 20 operate in pairs; one door system 20 of a pair allows entry into the enclosed area 12 and the other door system 20 of the pair allows egress from the enclosed area 12. In another embodiment, a single door system 20 may be used for both entry to and egress from the enclosed area 12.

FIG. 1 shows each door system pair in communication with a separate access controller 100. However, other combinations of controllers 100 and door systems 20 may be implemented in the access control system 10. For example, a single controller 100 may control all door systems 20 for respective enclosed area(s), or even in the case of more door systems than illustrated, provided the controller supports the increased number. Also the controller 100 is not necessarily limited to controlling door systems only for a respective single room or single building. In some examples, one controller 100 may control the door systems located within more than a single building.

The credential & policy directory 191 shown in FIG. 1 may represent one or many actual directories. The directories may be located remotely from the door systems 20. The directories may be operated by entities other than an operator assigned to the location of the door systems 20. Also, the credential & policy directory 191 may include identification information (for example, name, age, physical characteristics, badge photograph) for individuals who may be allowed access to enclosed area(s) associated with the door systems 20, the identification credentials of the individuals (for example, PIN/password, RFID tag, certificate), and other information.

The computer terminal 193 may be implemented by the same entity assigned to the location of the door systems 20. Alternatively, computer terminal 193 may be implemented by and at an entity separate and apart from that assigned to the location of the door systems 20.

As will be understood by one skilled in the art, the computer terminal 193 can receive event data from the access controllers 100 (for the purposes of event monitoring, for example).

FIG. 3 illustrates an example door system that may be implemented in the system of FIG. 1. In FIG. 3, the door system 20 is shown in communication with the access controller 100 over the communication path 130. The door system 20 includes the access door 22, door locking mechanism 24, door controller 26, and credential reader 28. The door 22 may be any door that allows individuals to enter or leave an associated enclosed area. The door 22 may include a position sensor (for example, a limit switch, which is not shown) that indicates when the door 22 is not fully closed. The position sensor may send a not-fully-closed signal over the signal path 21 to the door controller 26. The not-fully-closed signal may be sent continuously or periodically, and may or may not be sent until after a predefined time has expired.

With respect to the illustrated door system 20, the locking mechanism 24 includes a remotely operated electro-mechanical locking element (not shown) such as a dead bolt that is positioned (locked or unlocked) in response to an electrical signal sent over the signal path 21 from the door controller 26.

The door controller 26 receives credential information over the signal path 29 from the credential reader 28 and passes the information to the access controller 100 over another signal path 130. The door controller 26 receives lock/unlock signals from the access controller 100 over the signal path 130. The door controller 26 sends lock mechanism lock/unlock signals over the signal path 21 to the locking mechanism 24.

The credential reader 28 receives credential information 40 for an individual 42. The credential information 40 may be encoded in an RFI D chip, a credential on a smart card, a PIN/password input using a key pad, and biometric data such as fingerprint and retina scan data, for example.

The door system 20 operates based on access request signals sent to the access controller 100 and access authorization signals received, in response, from the access controller 100. The door system 20 may incorporate an auto lock feature that activates (locks) the door 22 within a specified time after the door 22 is opened and then shut, after an unlock signal has been sent to the locking mechanism 24 but the door 22 not opened within a specified time, or under other conditions. The auto lock logic may be implemented in the door controller 26 or the locking mechanism 24.

The door system 20 may send event signals to the computer terminal 193 by way of the access controller 100. Such signals include door open, door closed, locking mechanism locked, and locking mechanism unlocked. As noted above, the signals may originate from limit switches in the door system 20.

In one example embodiment, a door system 20 may be used only for entry and a separate door system 20 may be used only for egress.

However configured, the door systems 20 may trigger the event that indicates when an individual 42 enters the enclosed area 12 and when the individual 42 has exited the enclosed area 12, based on information obtained by reading credential information 40 of the individual 42 on entry and exit, respectively. These signals may be used to prevent reentry without an intervening exit, for example. The presence or absence of these signals also may be used to prevent access to areas and systems within the enclosed area. For example, the individual 42 may not be allowed to log onto his computer in the respective enclosed area in the absence of an entry signal originating from one of the door systems 20 of the respective enclosed area. Thus, the access controller 100 and its implemented security functions may be a first step in a cascading series of access operations to which the individual may be exposed.

The door systems 20 may incorporate various alarms, such as for a propped open door 22, a stuck unlocked locking mechanism 24, and other indications of breach or fault. Also, in a comprehensive surveillance system (described later herein in more detail) one or more video cameras (for example, video camera 169 as illustrated) may be placed in relative close proximity to the door 22 such that a Field Of View (FOV) of the video camera 169 captures images of the door 22 and an area around the door 22. In this manner, the system will capture video footage of the individual 42 which should show that person passing through (or attempting to pass through) the door 22 being monitored by video surveillance.

Reference is now made to FIG. 4 which shows a block diagram of an example system (comprehensive surveillance system 200) within which methods in accordance with example embodiments can be carried out. Included within the illustrated comprehensive surveillance system 200 (and in which access control is integrated with video surveillance) are one or more computer terminals 193 and a server system 208. In some example embodiments, the computer terminal 193 is a personal computer system; however in other example embodiments the computer terminal 193 is a selected one or more of the following: a handheld device such as, for example, a tablet, a phablet, a smart phone or a personal digital assistant (PDA); a laptop computer; a smart television; and other suitable devices. With respect to the server system 208, this could comprise a single physical machine or multiple physical machines. It will be understood that the server system 208 need not be contained within a single chassis, nor necessarily will there be a single location for the server system 208. As will be appreciated by those skilled in the art, at least some of the functionality of the server system 208 can be implemented within the computer terminal 193 rather than within the server system 208.

The computer terminal 193 communicates with the server system 208 through one or more networks. These networks can include the Internet, or one or more other public/private networks coupled together by network switches or other communication elements. The network(s) could be of the form of, for example, client-server networks, peer-to-peer networks, etc. Data connections between the computer terminal 193 and the server system 208 can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). In at least one example embodiment, the computer terminal 193 and the server system 208 are within the same Local Area Network (LAN).

The computer terminal 193 includes at least one processor 212 that controls the overall operation of the computer terminal. The processor 212 interacts with various subsystems such as, for example, input devices 214 (such as a selected one or more of a keyboard, mouse, touch pad, roller ball and voice control means, for example), random access memory (RAM) 216, non-volatile storage 220, display controller subsystem 224 and other subsystems [not shown]. The display controller subsystem 224 interacts with display 226 and it renders graphics and/or text upon the display 226.

Still with reference to the computer terminal 193 of the comprehensive surveillance system 200, operating system 240 and various software applications used by the processor 212 are stored in the non-volatile storage 220. The non-volatile storage 220 is, for example, one or more hard disks, solid state drives, or some other suitable form of computer readable medium that retains recorded information after the computer terminal 193 is turned off. Regarding the operating system 240, this includes software that manages computer hardware and software resources of the computer terminal 193 and provides common services for computer programs. Also, those skilled in the art will appreciate that the operating system 240, client-side video review application 244, the access control management application 253, and other applications 252, or parts thereof, may be temporarily loaded into a volatile store such as the RAM 216. The processor 212, in addition to its operating system functions, can enable execution of the various software applications on the computer terminal 193.

Still with reference to FIG. 4, the video review application 244 can be run on the computer terminal 193 and includes a search UI module 202 for cooperation with a search session manager module of the application in order to enable a computer terminal user to carry out actions related to providing input and, more specifically, input to facilitate identifying same individuals or objects appearing in a plurality of different video recordings. In such circumstances, the user of the computer terminal 193 is provided with a user interface generated on the display 226 through which the user inputs and receives information in relation the video recordings.

As mentioned, the video review application 244 also includes the search session manager module, which provides a communications interface between the search UI module 202 and a query manager module (i.e. a respective one of the one or more query manager modules 264) of the server system 208. In at least some examples, a search session manager module of the application 244 communicates with a respective one of the respective query manager module(s) 264 through the use of Remote Procedure Calls (RPCs).

Besides the query manager module(s) 264, the server system 208 includes several software components for carrying out other functions of the server system 208. For example, the server system 208 includes a media server module 268. The media server module 268 handles client requests related to storage and retrieval of video taken by video cameras 169 in the comprehensive surveillance system 200. The server system 208 also includes an analytics engine module 272. The analytics engine module 272 can, in some examples, be any suitable one of known commercially available software that carry out mathematical calculations (and other operations) to attempt computerized matching of same individuals or objects as between different portions of video recordings (or as between any reference image and video compared to the reference image). For example, the analytics engine module 272 can, in one specific example, be a software component of the Avigilon Control Center™ server software sold by Avigilon Corporation. In some examples the analytics engine module 272 can use the descriptive characteristics of the person's or object's appearance. Examples of these characteristics include the person's or object's shape, size, textures and color.

The server system 208 also includes a number of other software components 276. These other software components will vary depending on the requirements of the server system 208 within the overall system. As just one example, the other software components 276 might include special test and debugging software, or software to facilitate version updating of modules within the server system 208. The server system 208 also includes one or more data stores 290. In some examples, the data store 290 comprises one or more databases 291 which facilitate the organized storing of recorded video.

Regarding the video cameras 169, each of these includes a camera module 198. In some examples, the camera module 198 includes one or more specialized integrated circuit chips to facilitate processing and encoding of video before it is even received by the server system 208. For instance, the specialized integrated circuit chip may be a System-on-Chip (SoC) solution including both an encoder and a Central Processing Unit (CPU) and/or Vision Processing Unit (VPU). These permit the camera module 198 to carry out the processing and encoding functions. Also, in some examples, part of the processing functions of the camera module 198 includes creating metadata for recorded video. For instance, metadata may be generated relating to one or more foreground areas that the camera module 198 has detected, and the metadata may define the location and reference coordinates of the foreground visual object within the image frame. For example, the location metadata may be further used to generate a bounding box, typically rectangular in shape, outlining the detected foreground visual object. The image within the bounding box may be extracted for inclusion in metadata. The extracted image may alternately be smaller then what was in the bounding box or may be larger then what was in the bounding box. The size of the image being extracted can also be close to, but outside of, the actual boundaries of a detected object.

In some examples, the camera module 198 includes a number of submodules for video analytics such as, for instance, an object detection submodule, an instantaneous object classification submodule, a temporal object classification submodule and an object tracking submodule. Regarding the object detection submodule, such a submodule can be provided for detecting objects appearing in the field of view of the camera 169. The object detection submodule may employ any of various object detection methods understood by those skilled in the art such as, for example, motion detection and/or blob detection.

Regarding the object tracking submodule that may form part of the camera module 198, this may be operatively coupled to both the object detection submodule and the temporal object classification submodule. The object tracking submodule may be included for the purpose of temporally associating instances of an object detected by the object detection submodule. The object tracking submodule may also generate metadata corresponding to visual objects it tracks.

Regarding the instantaneous object classification submodule that may form part of the camera module 198, this may be operatively coupled to the object detection submodule and employed to determine a visual objects type (such as, for example, human, vehicle or animal) based upon a single instance of the object. The input to the instantaneous object classification submodule may optionally be a sub-region of an image in which the visual object of interest is located rather than the entire image frame.

Regarding the temporal object classification submodule that may form part of the camera module 198, this may be operatively coupled to the instantaneous object classification submodule and employed to maintain class information of an object over a period of time. The temporal object classification submodule may average the instantaneous class information of an object provided by the instantaneous classification submodule over a period of time during the lifetime of the object. In other words, the temporal object classification submodule may determine a type of an object based on its appearance in multiple frames. For example, gait analysis of the way a person walks can be useful to classify a person, or analysis of the legs of a person can be useful to classify a cyclist. The temporal object classification submodule may combine information regarding the trajectory of an object (e.g. whether the trajectory is smooth or chaotic, whether the object is moving or motionless) and confidence of the classifications made by the instantaneous object classification submodule averaged over multiple frames. For example, determined classification confidence values may be adjusted based on the smoothness of trajectory of the object. The temporal object classification submodule may assign an object to an unknown class until the visual object is classified by the instantaneous object classification submodule subsequent to a sufficient number of times and a predetermined number of statistics having been gathered. In classifying an object, the temporal object classification submodule may also take into account how long the object has been in the field of view. The temporal object classification submodule may make a final determination about the class of an object based on the information described above. The temporal object classification submodule may also use a hysteresis approach for changing the class of an object. More specifically, a threshold may be set for transitioning the classification of an object from unknown to a definite class, and that threshold may be larger than a threshold for the opposite transition (for example, from a human to unknown). The temporal object classification submodule may aggregate the classifications made by the instantaneous object classification submodule.

In some examples, the camera module 198 is able to detect humans and extract images of humans with respective bounding boxes outlining the human objects for inclusion in metadata which, along with the associated video, may transmitted to the server system 208. At the system 208, the media server module 268 can process extracted images and generate signatures (e.g. feature vectors) to represent objects. In computer vision, a feature descriptor is generally known as an algorithm that takes an image and outputs feature descriptions or feature vectors. Feature descriptors encode information, i.e. an image, into a series of numbers to act as a numerical "fingerprint" that can be used to differentiate one feature from another. Ideally this information is invariant under image transformation so that the features may be found again in another image of the same object. Examples of feature descriptor algorithms are SIFT (Scale-invariant feature transform), HOG (histogram of oriented gradients), and SURF (Speeded Up Robust Features).

In accordance with at least some examples, a feature vector is an n-dimensional vector of numerical features (numbers) that represent an image of an object processable by computers. By comparing the feature vector of a first image of one object with the feature vector of a second image, a computer implementable process may determine whether the first image and the second image are images of the same object.

Similarity calculation can be just an extension of the above. Specifically, by calculating the Euclidean distance between two feature vectors of two images captured by one or more of the cameras 169, a computer implementable process can determine a similarity score to indicate how similar the two images may be.

In some examples, the camera module 198 is able to detect humans and extract images of humans with respective bounding boxes outlining the human objects for inclusion in metadata which along with the associated video may transmitted to the server system 208. At the server system 208, the media server module 268 can process extracted images and generate signatures (e.g. feature vectors) to represent objects. In this example implementation, the media server module 268 uses a learning machine to process the bounding boxes to generate the feature vectors or signatures of the images of the objects captured in the video. The learning machine is for example a neural network such as a convolutional neural network (CNN) running on a graphics processing unit (GPU). The CNN may be trained using training datasets containing millions of pairs of similar and dissimilar images. The CNN, for example, may be a Siamese network architecture trained with a contrastive loss function to train the neural networks.

The media server module 268 deploys a trained model in what is known as batch learning where all of the training is done before it is used in the appearance search system. The trained model, in this embodiment, is a CNN learning model with one possible set of parameters. There is, practically speaking, an infinite number of possible sets of parameters for a given learning model. Optimization methods (such as stochastic gradient descent), and numerical gradient computation methods (such as backpropagation) may be used to find the set of parameters that minimize the objective function (also known as a loss function). A contrastive loss function may be used as the objective function. A contrastive loss function is defined such that it takes high values when it the current trained model is less accurate (assigns high distance to similar pairs, or low distance to dissimilar pairs), and low values when the current trained model is more accurate (assigns low distance to similar pairs, and high distance to dissimilar pairs). The training process is thus reduced to a minimization problem. The process of finding the most accurate model is the training process, the resulting model with the set of parameters is the trained model, and the set of parameters is not changed once it is deployed onto the appearance search system.

In at least some alternative example embodiments, the media server module 268 may determine feature vectors by implementing a learning machine using what is known in the art as online machine learning algorithms. The media server module 268 deploys the learning machine with an initial set of parameters; however, the appearance search system keeps updating the parameters of the model based on some source of truth (for example, user feedback in the selection of the images of the objects of interest). Such learning machines also include other types of neural networks as well as convolutional neural networks.

In accordance with at least some examples, storage of feature vectors within the comprehensive surveillance system 200 is contemplated. For instance, feature vectors may be indexed and stored in the database 291 with respective video. The feature vectors may also be associated with reference coordinates to where extracted images of respective objects are located in respective video. Storing may include storing video with, for example, time stamps, camera identifications, metadata with the feature vectors and reference coordinates, etc.

Still with reference to FIG. 4, illustrated door systems 20A-20F were already discussed extensively (i.e. earlier detailed description parts herein provided in relation to FIGS. 1-3). As shown, the door systems 20A-20F are communicatively linked to the server system 208 through respective access controllers 100. Also, the one or more databases 291 can include the credential and policy directory 191 (or alternatively the server system could include a separate storage, i.e. distinct from the storage 290, for the purpose of supporting the credential and policy directory).

As will be understood by those skilled in the art, each of the access controllers 100 may log events, and the logs may be configured via an interface provided by the UI module 255 of the access control application 253 to establish any number of devices, services, and systems as event recipients. The access controller 100 may send the events to a remote monitoring service in any number of formats including, for example, SNMP, XML via direct socket connection (GSM, LAN, WAN, WiFi™), Syslog, and through a serial port.

Figure 5:
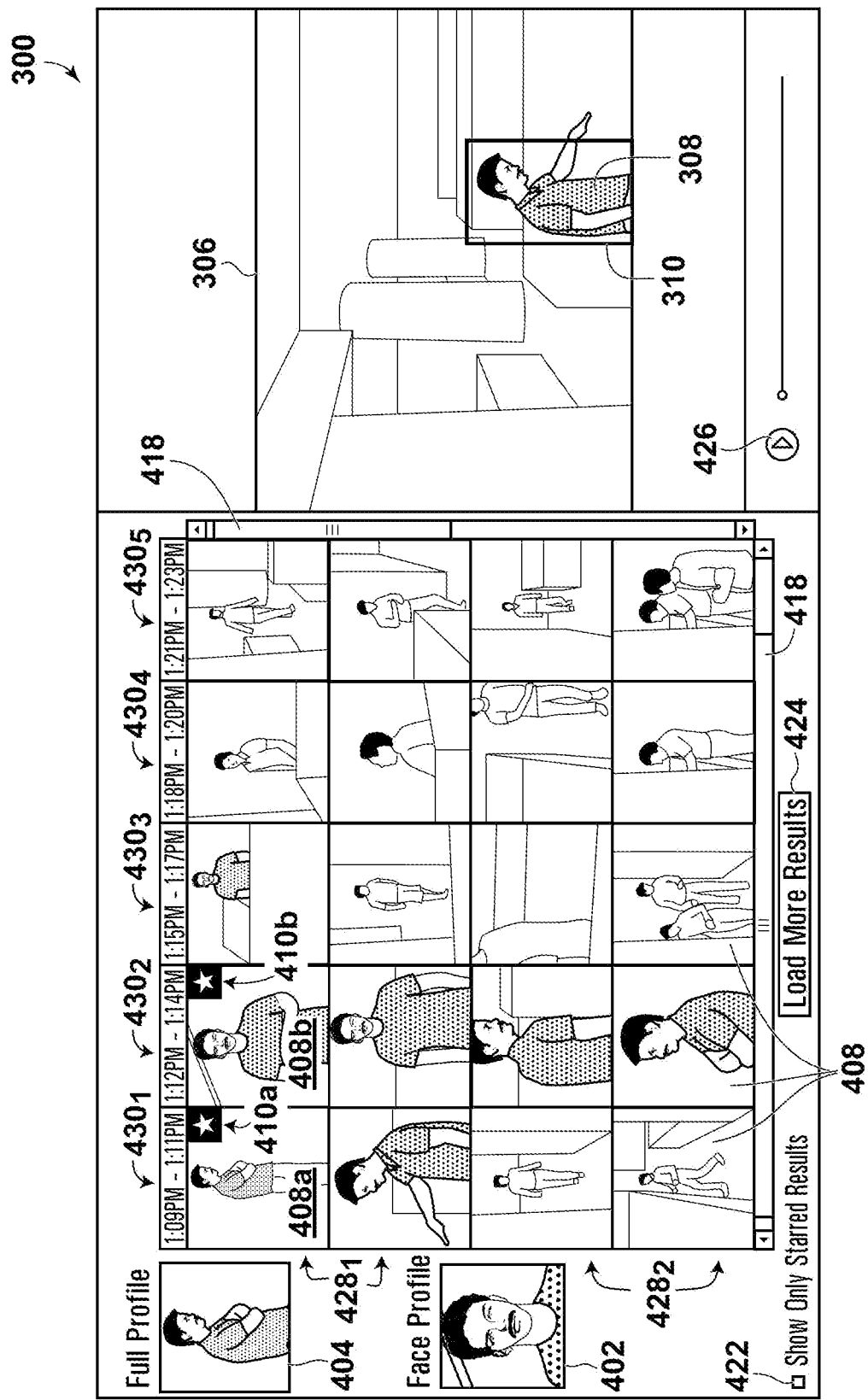
FIG. 5 illustrates a user interface page of a VMS application in accordance with an example embodiment.

Referring now to FIG. 5, there is shown a user interface page 300 including an image frame 306 of a selected video recording that permits a user of the application 244 to commence a search for a person-of-interest 308. The selected video recording shown in FIG. 5 is one of the collection of video recordings obtained using different cameras 169 to which the user has access via the application 244. The application 244 displays the page 300 on the display 226 of the computer terminal 193. The user provides input to the application 244 via the input device 214 (for example, a mouse, a touch pad, etc.). In FIG. 5, displaying the image frame 306 comprises the application 244 displaying the image frame 306 as a still image, although in different embodiments displaying the image frame 306 may comprise playing the selected video recording or playing the selected video recording.

The image frame 306 depicts a scene in which one or more persons may be present. The server system 208 automatically identifies persons appearing in the scene that may be the subject of a search, and thus who are potential persons-of-interest 308 to the user, and highlights each of those persons by enclosing all or part of each in a bounding box 310.

Still with reference to FIG. 5, immediately to the left of the image frame 306, image search results 408 selected from the collection of video recordings by the server system 208 as potentially corresponding to the person-of-interest 308; and, immediately to the left of the image search results 408 and bordering a left edge of the page 300, a face thumbnail 402 and a body thumbnail 404 of the person-of-interest 308.

While video is being recorded, at least one of the cameras 169 and server system 208 in real-time identify when people, each of whom is a potential person-of-interest 308, are being recorded and, for those people, attempt to identify each of their faces. The server system 208 generates signatures based on the faces (when identified) and bodies of the people who are identified, as described above. The server system 108 stores information on whether faces were identified and the signatures as metadata together with the video recordings.

In response to the search commencement user input provided by the user, the server system 208 generates the image search results 408 by searching the collection of video recordings for the person-of-interest 308. The server system 208 performs a combined search including a body search and a face search on the collection of video recordings using the metadata recorded for the person-of-interest's 308 body and face, respectively. More specifically, the server system 208 compares the body and face signatures of the person-of-interest 308 the user indicates he or she wishes to perform a search on to the body and face signatures, respectively, for the other people the system 208 has identified. The server system 208 returns the search results 408, which includes a combination of the results of the body and face searches, which the application 244 uses to generate the page 300. Any suitable method may be used to perform the body and face searches; for example, the server system 208 may use a convolutional neural network when performing the body search.

In one example embodiment, the face search is done by searching the collection of video recordings for faces. Once a face is identified, the coordinates of a bounding box that bounds the face (e.g., in terms of an (x,y) coordinate identifying one corner of the box and width and height of the box) and an estimation of the head pose (e.g., in terms of yaw, pitch, and roll) are generated. For example, for each face, any one or more of distance between the corners of eyes, distance between the centers of eyes, nose width, depth of eye sockets, shape of cheekbones, shape of jaw line, shape of chin, hair color, and the presence and color of facial hair may be used as metrics. Once the feature vectors are generated for the faces, the Euclidean distance between vectors for different faces may be determined and used to assess face similarity. As another example, a feature vector may be generated by the media server module 268 as discussed above.

In at least one example embodiment, the cameras 169 generate the metadata and associated feature vectors in or nearly in real-time, and the server system 208 subsequently assesses face similarity using those feature vectors. However, in at least one alternative example embodiment the functionality performed by the cameras 169 and server system 208 may be different. For example, functionality may be divided between the server system 208 and cameras 169 in a manner different than as described above. Alternatively, one of the server system 208 and the cameras 169 may generate the feature vectors and assess face similarity.

In FIG. 5, the application 244 uses as the body thumbnail 404 at least a portion of an image frame that is contained within a bounding box that highlights all of the body (to the extent unobscured) of the person-of-interest. The application 244 uses as the face thumbnail 402 at least a portion of one of the face search results that satisfy a minimum likelihood that that result corresponds to the person-of-interest's 308 face; in one example embodiment, the face thumbnail 402 is drawn from the result of the face search that is most likely to correspond to the person-of-interest's 308 face. Additionally or alternatively, the result used as the basis for the face thumbnail 402 is one of the body search results that satisfies a minimum likelihood that the result correspond to the person-of-interest's 308 body.

In FIG. 5, the image search results 408 comprise multiple images arranged in an array comprising n rows 428 and m columns 430, with n=1 corresponding to the array's topmost row 428 and m=1 corresponding to the array's leftmost column 430. The results 408 are positioned in a window along the right and bottom edges of which extend scroll bars 418 that permit the user to scroll through the array. In FIG. 5, the array comprises at least 4×5 images, as that is the portion of the array that is visible without any scrolling using the scroll bars 418.

Each of the columns 430 of the image search results 408 corresponds to a different time period of the collection of video recordings. In the example of FIG. 5, each of the columns 430 corresponds to a three minute duration, with the leftmost column 430 representing search results 408 from 1:09 p.m. to 1:11 p.m., inclusively, the rightmost column 430 representing search results 408 from 1:21 p.m. to 1:23 p.m., inclusively, and the middle three columns 430 representing search results 408 from 1:12 p.m. to 1:20 p.m., inclusively. Additionally, in FIG. 5 each of the image search results 408 is positioned on the display 226 according to a likelihood that the image search result 408 corresponds to the person-of-interest 308. In the embodiment of FIG. 5, the application 244 implements this functionality by making the height of the image search result 408 in the array proportional to the likelihood that image search result 408 corresponds to the person-of-interest 308. Accordingly, for each of the columns 430, the search result 408 located in the topmost row 428 (n=1) is the result 408 for the time period corresponding to that column 430 that is most likely to correspond to the person-of-interest 308, with match likelihood decreasing as n increases.

In the depicted embodiment, all of the search results 408 satisfy a minimum likelihood that they correspond to the person-of-interest 308; for example, in certain embodiments the application 244 only displays search results 408 that have at least a 25% likelihood ("match likelihood threshold") of corresponding to the person-of-interest 308. However, in certain other embodiments, the application 244 may display all search results 408 without taking into account a match likelihood threshold, or may use a non-zero match likelihood threshold that is other than 25%.

In FIG. 5, the body and face thumbnails 404,402 include at least a portion of a first image 408a and a second image 408b, respectively, which include part of the image search results 408. Overlaid on the first and second images 408a,b are a first and a second indicator 410a,b respectively, indicating that the first and second images are the bases for the body and face thumbnails 404,402. In FIG. 5 the first and second indicators 410a,b are identical stars, although in different embodiments (not depicted) the indicators 410a,b may be different.

Located immediately below the image frame 306 of the selected video recording are playback controls 426 that allow the user to play and pause the selected video recording. Located immediately below the horizontal scroll bar 418 beneath the image search results 408 is a load more results button 424, which permits the user to prompt the application 244 for additional search results 408. For example, in one embodiment, the application 244 may initially deliver at most a certain number of results 408 even if additional results 408 exceed the match likelihood threshold. In that example, the user may request another tranche of results 408 that exceed the match likelihood threshold by selecting the load more results button 424. In certain other embodiments, the application 244 may be configured to display additional results 408 in response to the user's selecting the button 424 even if those additional results 408 are below the match likelihood threshold.

Located below the thumbnails 402,404 is a filter toggle 422 that permits the user to restrict the image search results 408 to those that the user has confirmed corresponds to the person-of-interest 308 by having provided match confirmation user input to the application 244.

Figure 6:
FIG. 6 illustrates another user interface page of the VMS application in accordance with an example embodiment.

Reference is now made to FIG. 6 which illustrates another user interface page 600 of the application 244. In the illustrated example, the search for a person-of-interest is initiated by specific search input 610, namely an inputted name "Cromwell, Anthony". As will be appreciated by those skilled in the art, any number of names of registered users can be stored in the database for the credential and policy information (for example, the names of the registered users of the access control system 10 could be all stored in the database 291). Thus, in accordance with some examples of the illustrated example embodiment, the VMS application user types in the name "Cromwell, Anthony" and, based on a query to the database 291, that name is recognized as one of the registered users of the access control system 10, and that identified user is linked within the overall system to facial image 620 which is displayed within the user interface page 600. In some examples, the image 620 can be derived or otherwise obtained from a security badge photo.

In response to a search being initiated based on the search input 610, search results 630-632 are displayed within the user interface page 600. Each of the search results 630-632 corresponds to an access control event where an image of "Cromwell, Anthony" has been captured by a video camera at the location of the access control event (as mentioned previously, any number of the video cameras 169 may be placed in relative close proximity to respective doors 22 to enable such video footage to be captured).

Next, the VMS application user moves icon 640 over an image 644 of "Cromwell, Anthony" associated with the search result 630. By doing so, two icons then appear superimposed over the image 644: magnifying glass icon 648 and star icon 650. Clicking on the magnifying glass icon 648 will create a blown-up version of the image 644. Regarding the star icon 650, clicking on this one will initiate an appearance search using the image 644 as the reference image for the search. Also, it will be understood that the appearance of icons 648 and 650 are not unique to the search result 630. Similar icons/options can be made to appear by hovering the icon 640 over either image 680 associated with the search result 631 or image 690 associated with the search result 632.

Figure 7:
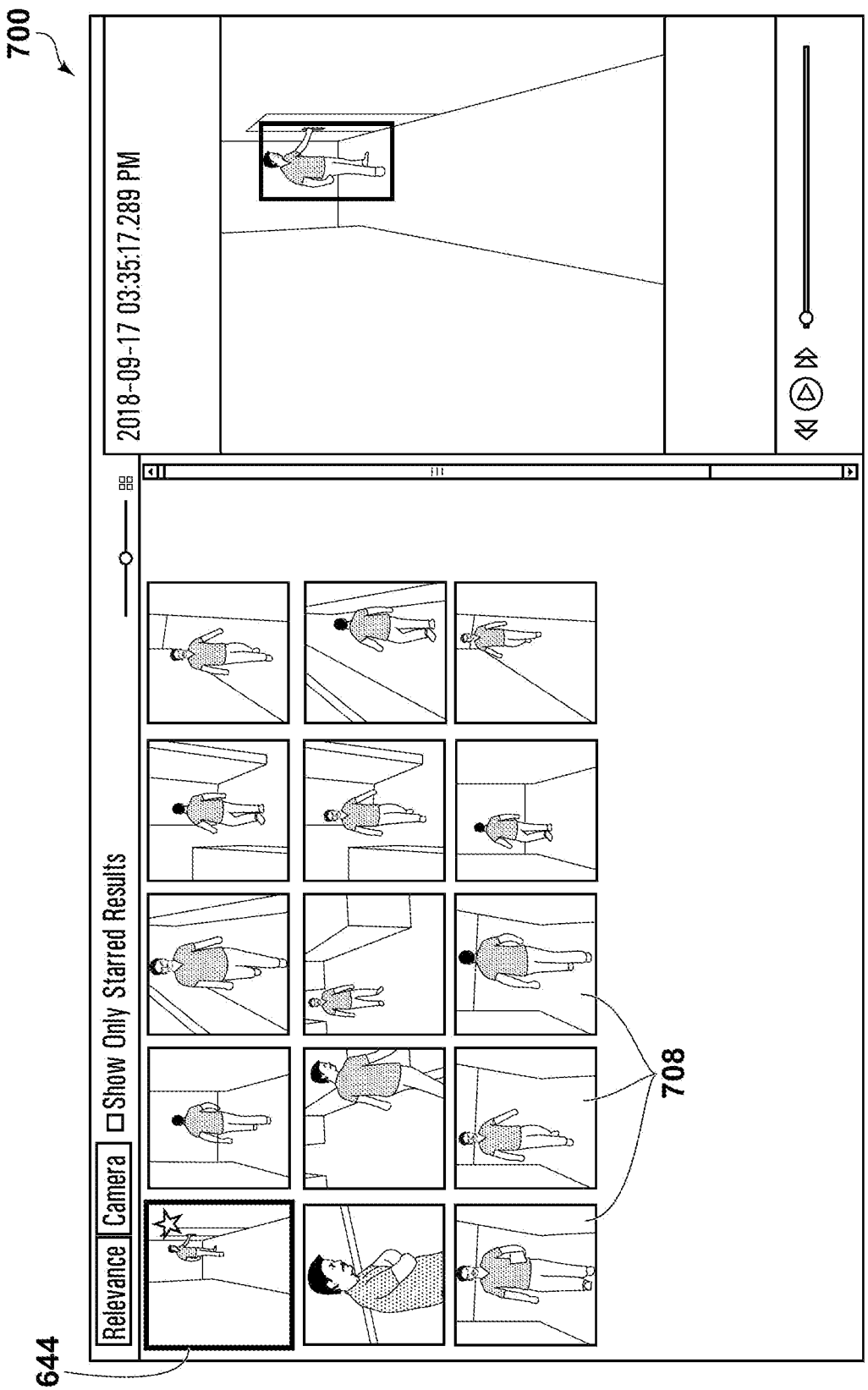
FIG. 7 illustrates yet another user interface page of the VMS application in accordance with yet another example embodiment.

Reference is now made to FIG. 7 which illustrates another user interface page 700 of the application 244. In accordance with the illustrated example embodiment, image search results 708 appear in response to the star icon 650 (FIG. 6) being clicked on. The image search results 708 can be interacted with in a manner similar to how the image results 408 can be interacted with as previously herein described in relation to FIG. 5.

Figure 8:
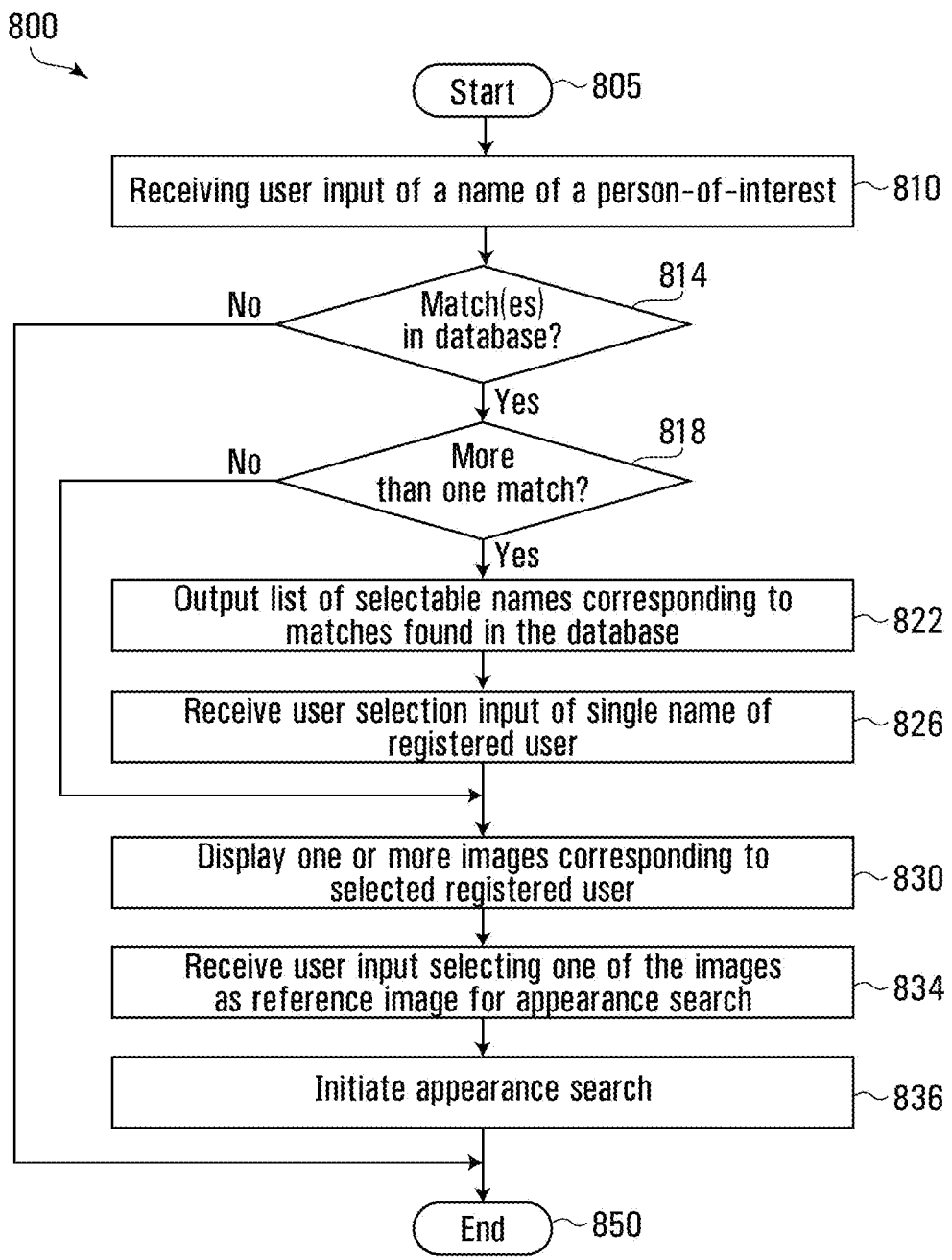
FIG. 8 is a flowchart depicting a method for finding and selecting a reference image of a person-of-interest to be employed in connection with an appearance search, according to an example embodiment.

Reference is now made to FIG. 8 which is a flow chart illustrating a method 800 in accordance with an example embodiment. As a first action 810 in the illustrated method 800, user input, in the form of a name of a person-of-interest, is received. For example, a user of the computer terminal 193 (FIG. 1) can use one of the input devices 214 to enter the name of the person-of-interest as input. This input may be received by, for example, the UI module 202 of the application 244; however alternative implementations are also contemplated. For instance, the UI module 255 of the access control application 253 may instead receive the input.

Next the inputted name is checked (814) to see if there are any matches in the applicable database. For example, the computer terminal 193 can communicate with a respective one of the query manager module(s) 264 to query the credential and policy directory 191 (FIG. 1) in connection with determining if match(es) exist.

Next if no matches are found, the method 800 ends (850). However, if at least one match is found then the computer terminal checks (818) whether there is only a single match, or whether there are two or more matches. If there is only a single match, then actions 822 and 826 may be skipped (alternatively the user may be prompted to first provide confirmation within a screen that displays a stored facial image or other image aid corresponding to the matched single name); however if there are two or more matches then the matches are outputted (822) as selectable names within a UI page of the application 244, for a user thereof to select. Also, images aids, in accordance with some examples, may be provided beside respective selectable names. For instance, a respective thumbnail-size facial image (for example, badge photo) may be positioned beside each selectable name within the UI page.

Following the action 822, user selection input of a single name (i.e. from the plurality of selectable names) and corresponding to single registered user within the access control system 10, is received (826).

Next one or more images of the selected registered user are displayed (830) on the display 226 (FIG. 1) within a UI page of the VMS application running on the computer terminal 193. An example of this has already been previously described in detail in connection with FIG. 6 (i.e. the images 644, 680 and 690).

Next the UI module 202 of the client-side video review application 244 receives user input (834) with respect to the displayed images. More specifically, one of displayed images is selected as a reference image for the purpose of an appearance search, and following this selection the appearance search is then initiated (836) using the selected reference image.

The method 800 ends following the action 836.

Alterations, modification and variations may be effected to the above discussed embodiments by those skilled in the art without departing from the scope of the application. Therefore, the above discussed embodiments are considered to be illustrative and not restrictive, and the invention should be construed as limited only by the appended claims.

The invention claimed is:

1. A method comprising:
   receiving user input of a name via a first user interface page generated by a computing device;
   matching the name to a single person registered in an access control database;
   populating a second user interface page with one or more images, each of the one or more images showing the single person, and each of the one or more images captured by a first video camera of a surveillance system contemporaneously with one or more respective access control event occurrences identifiable to the single person;
   receiving user selection input that marks at least one of the images as a reference image for an appearance search that uses at least one learning machine to find additional images of the single person captured by second one or more other video cameras within the surveillance system; and
   running the appearance search during which the at least one learning machine is used.

2. The method of claim 1, wherein the matching further includes displaying a list of more than one identities of people who could match the name, and receiving further user input identifying a single identity, amongst the identities of people, who matches the name.

3. The method of claim 1, wherein the first and second interface pages are different interface pages.

4. The method of claim 1, wherein the matching further includes displaying a list of one or more identities of people who could match the name, and receiving further user input identifying a single identity, amongst the one or more identities of people, who matches the name.

5. The method of claim 1, wherein each of the one or more images form a part of a respective video clip showing the single person unlocking, opening and entering a respective one of the access controlled doors.

6. The method of claim 1, wherein the computing device is one of the following: a personal computer system, a tablet, a phablet, a smart phone, a personal digital assistant, a laptop computer, and a smart television.

7. The method of claim 1, wherein the access control event is an access door unlocking.

8. The method of claim 1, wherein the access control database is in a same physical storage being employed to store video captured by the first and second video cameras.

9. A tangible, non-transitory, computer-readable storage medium having instructions encoded therein, wherein the instructions, when executed by at least one processor, cause a carrying out of a method comprising:
   generating a first user interface page;
   receiving user input of a name via the first user interface page;
   matching the name to a single person registered in an access control database;
   populating a second user interface page with one or more images, each of the one or more images showing the single person, and each of the one or more images captured by a first video camera of a surveillance system contemporaneously with one or more respective access control event occurrences identifiable to the single person;
   receiving user selection input that marks at least one of the images as a reference image for an appearance search that uses at least one learning machine to find additional images of the single person captured by second one or more other video cameras within the surveillance system; and
   running the appearance search during which the at least one learning machine is used.

10. The tangible, non-transitory, computer-readable storage medium of claim 9, wherein the matching further includes displaying a list of more than one identities of people who could match the name, and receiving further user input identifying a single identity, amongst the identities of people, who matches the name.

11. The tangible, non-transitory, computer-readable storage medium of claim 9, wherein the first and second interface pages are different interface pages.

12. The tangible, non-transitory, computer-readable storage medium of claim 9, wherein the matching further includes displaying a list of one or more identities of people who could match the name, and receiving further user input identifying a single identity, amongst the one or more identities of people, who matches the name.

13. The tangible, non-transitory, computer-readable storage medium of claim 9, wherein the access control event is an access door unlocking.

14. The tangible, non-transitory, computer-readable storage medium of claim 9, wherein the access control database is in a same physical storage being employed to store video captured by the first and second video cameras.

15. The method of claim 1, wherein the at least one learning machine is an at least one convolutional neural network.

16. The method of claim 1, wherein the user input of the name is typed user input of the name.

17. The tangible, non-transitory, computer-readable storage medium of claim 9, wherein the at least one learning machine is an at least one convolutional neural network.

18. The tangible, non-transitory, computer-readable storage medium of claim 9, wherein the user input of the name is typed user input of the name.

* * * * *